June 15, 1965 K. W. COWANS 3,188,830

THERMAL OSCILLATION FILTER

Filed Aug. 3, 1964

INVENTOR.
KENNETH W. COWANS,
BY Robert Thompson
ATTORNEY.

United States Patent Office 3,188,830
Patented June 15, 1965

3,188,830
THERMAL OSCILLATION FILTER

Kenneth W. Cowans, Playa del Rey, Calif., assignor to Hughes Aircraft Company, Culver City, Calif., a corporation of Delaware Filed Aug. 3, 1964, Ser. No. 386,906
12 Claims. (Cl. 62—259)

This invention relates generally to a device for filtering heat flux excursions or oscillations and more particularly to a thermal filter for smoothing oscillations in heat flux or cold being conducted from a cyclic refrigerator to an infrared detector at cryogenic temperatures.

Heretofore, transfer of cold from a cyclicallyy operated refrigerator to a heat load of the type which must be maintained at a virtually constant cryogenic temperature has been a problem. Conventional heat conductors, such as copper, have a relatively slow or large thermal time constant (the thermal time constant of a body being that time in which a sudden change of the body's surface temperature will be 90% accomplished throughout the body) at relatively high operating temperatures, such as room temperature. This thermal time constant, however, tends to become very fast or small at cryogenic temperatures. For instance, between a temperature range from 15° K. to 10° K. the thermal time constant of a body of copper about one cm. in diameter is in the microsecond range. Thus, any thermal oscillations generated at the cyclic cryostat or refrigerator are almost immediately conducted to the heat load. Thermal oscillation of this or any other type is especially bothersome with infrared radiation detectors, such as cooper-doped-germanium, which are sensitive to temperature fluctuations as small as $\pm 10^{-6}$° C.

Accordingly, it is an object of this invention to provide a device for filtering out thermal oscillations in heat flux conducted between a cyclic cryostat engine and a heat load whereupon temperature variation at the heat load is virtually eliminated.

Another object is to filter heat flux oscillations without substantially reducing or attenuating the temperature thereof.

Still another object is to provide a thermal oscillation filter for operation in the cryostat temperature ranges below 50° K. and especially in the temperature range from below 15° K.

The above and other objectives of this invention are accomplished by providing a cyclic cryostatic refrigerator or engine which accepts heat in a pulsating manner for cooling a heat load, such as an infrared detector. A heat transfer device including a thermal oscillation filter is connected between the cryostat refrigerator and the heat load to continuously cool the heat load and smooth or filter temperature oscillations or excursions at the heat load. The thermal heat filter includes a thermal capacitor of a predetermined mass which is in thermal contact with a heat conductor and which is operable to alternately accept heat from and reject heat to the heat conductor path thereby partially smoothing or dampening heat flux oscillations in the heat conductor path. The partially smoothed heat flux is further dampened or filtered by a thermal length filter of a predetermined length and cross-sectional area which is connected between the heat conductor and the heat load whereby temperature oscillations at the heat load are virtually eliminated.

Other objects, features, and advantages of this invention will become apparent upon reading the following detailed description of an embodiment of this invention and referring to the accompanying drawings in which.

Figure 1:
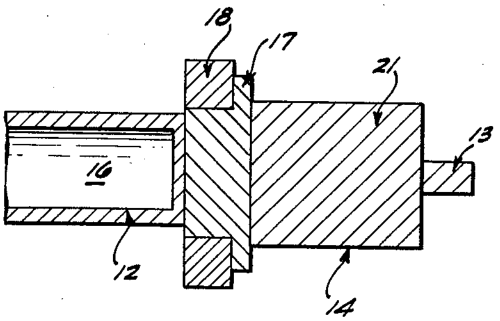
FIG. 1 is a schematic diagram of the thermal oscillation filter of this invention.

Referring now to FIG. 1 a cyclic cryogenic refrigerator or engine 12 is connected to continuously cool a heat load 13 by transmitting heat flux through a thermal oscillation filter 14 secured between them. As a result of the thermal dampening characteristics of the thermal oscillation filter 14, the heat flux supplied to the heat load 13 is maintained virtually constant even though there is a cyclic oscillation in the heat flux input from the refrigerator 12.

Referring more specifically to the device illustrated in FIG. 1, the cryogenic refrigerator or engine 12 cyclically accepts and rejects heat at a rate of 10 or more cycles per second. One type of cryogenic engine which can be used operates on the Stirling cycle principle—an example of which is the Solvay engine. The mode of operation of this engine is somewhat similar to the operation of a steam engine in that pressurized gas is transferred into an expansion chamber to drive a piston (not shown). The main distinction between the cryogenic engine and a steam engine is that the cold obtained from the expanded gas is the desired quantity rather than the work done by the piston.

In the cryogenic engine 12 a refrigerant gas, such as helium, is cyclically transferred into and exhausted from an expansion chamber 16, thereby eventually decreasing the temperature of the gas to about 12° K., whereupon the temperature stabilizes except for a temperature oscillation over each cycle of about ±1.0° C. During expension and exhaust phases of the cycle the gas is colder and heat is accepted by the engine 12. During other phases of the cycle little or no heat is accepted by the engine and some heat may even be rejected to the load.

Referring now to the details of the thermal oscillation filter 14, heat is accepted by the cryoengine 12 from a heat conductor 17 which provides a path for heat flow from the engine 12. The heat conductor 17 is made of some efficient heat conducting material, which has relatively good structural strength, such as copper. At the higher operating temperatures (room temperature) the thermal time instant of copper is relatively long or large. When, however, the operating temperature of the copper decreases to a range between 15° K. and 10° K. the thermal time constant of a small body of copper is in microseconds. Thus, any temperature oscillation at the cryogenic engine 12 also occurs almost immediately throughout the heat conductor 17.

In order to smooth out or dampen these temperature oscillations, a thermal input capacitor 18 having a high thermal capacity is secured in thermal contact with the heat conductor 17. Because of its high thermal capacitance, lead is an especially good material to use at the cryogenic temperature ranges between 50° K. and 12° K. In addition, lead has a fairly fast thermal time constant in the cryogenic ranges and as a result can accept and reject heat rather quickly. The volume of the thermal input capacitor 18 is of primary importance since it must have sufficient mass to absorb or store heat received from the heat conductor 17 during the warmer portion of a cycle and to transfer this heat back to the heat conductor 17 during the remaining colder portion of the cycle. There must also be good contact between the heat conductor and the thermal input capacitor for adequate heat transfer therebetween. As a result, any temperature oscillations or excursions in the heat conductor 17 are substantially dampened or reduced by the heat storage and transfer operation of thermal input capacitor 18.

A thermal length filter 21 having a relatively long or large thermal time constant and a fairly large heat capacitance is secured in thermal contact with the end of the heat conductor 17 which is remote from the cryogenic refrigerator 12. One material which is suitable for the thermal length filter is an alloy of about 50% lead and 50% indium. Although the mass of the thermal length filter is not of primary importance, the length and shape are critical since the length determines the amount of dampening available and the shape reduces thermal gradients. Thus, by using the thermal length filter 21, it is possible to further dampen or smooth any temperature oscillations in the heat conductor 17 to such degree that the temperature seen by the heat load 13 is virtually constant.

The heat load 13 can be any temperature sensitive device, such as an infrared detector. An example of one type of detector would be a copper-doped-germanium alloy which is sensitive to temperature variations of $10^{-6}$° K. Thus, by using a proper arrangement of elements in the above described thermal oscillation filter 14, it is possible to reduce the temperature excursions at the heat load 13 to $\pm 10^{-7}$° C.

Figure 2:
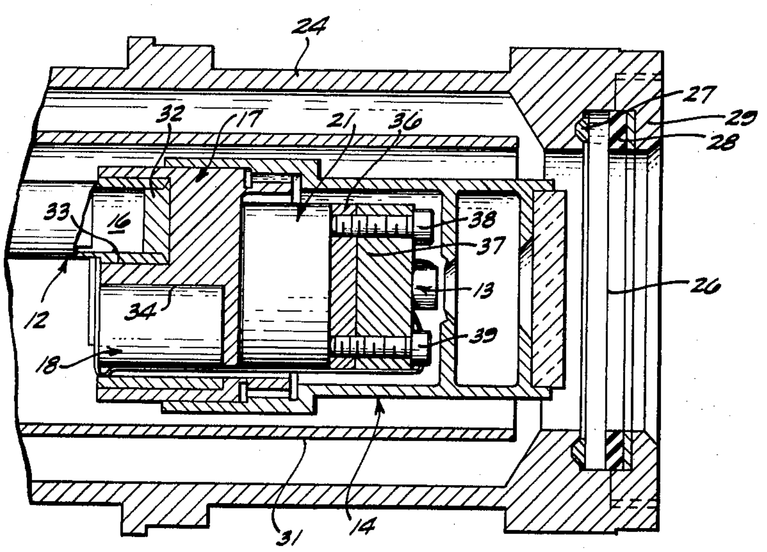
FIG. 2 is a side elevation view partly in cross section of a thermal oscillation filter.

One thermal oscillation filter which has been constructed is illustrated in FIG. 2. The cyclic cryogenic engine 12 and thermal oscillation filter 14 are mounted and enclosed within the bore of an outer housing 24 having an infrared filter window 26 secured across one end thereof. An appropriate inner sealing gasket 27 is seated in a groove and abuts the inner surface of the filter window 26 while an O-ring gasket 28 is seated against the outer surface. Air-tight seating is obtained by a clamping flange 29 which compresses both gaskets against the window 26. The chamber of outer housing 24 is evacuated to provide thermal insulation for the thermal oscillation filter 14 and cryogenic engine 12. In addition, a reflective tube 31 is mounted about the cryogenic refrigerator 12 and the thermal oscillation filter 14 to reduce radiant energy transfer.

The cyclic cryogenic engine 12 can be a Solvay engine type with the expansion chamber 16 illustrated as being broken away to show the interior thereof. As gas within the expansion chamber 16 expands it cools down to accept heat into the expansion chamber from an end plug 32 through the heat conductor 17.

Heat conductor 17 is substantially cylindrical with its axis mounted coaxially within the outer housing 24. Roughly, the dimensions are ¾ inch long and ⅞ inch in diameter. The flat rearward face thereof is bored out to provide a cylindrical aperture 33 which receives the cryogenic engine 12 in intimate thermal contact. The heat conductor 17 is made of copper and has a thermal time constant at room temperature in a time range of seconds. When the temperature of the copper reaches the cryogenic ranges of from 10–15° K., however, the thermal time constant is in the microsecond range. As a result, any heat flux or temperature change which occurs in the expansion chamber 12 almost immediately occurs throughout the entire heat conductor 17.

To dampen these oscillations, the heat conductor is bored to provide an aperture 34 for receiving a cylindrical thermal input capacitor 18 which has a much higher thermal capacity than the copper at cryogenic temperatures. At cryogenic temperatures, lead has a high thermal capacity and a relatively short thermal time constant in the millisecond range. Because of its relatively fast or small thermal time constant and its high thermal capacity lead is able to accept or reject heat from the heat conductor 17 to substantially dampen temperature oscillation in the heat conductor 17. The size of the thermal input capacitor is ½ inch long and ⅜ inch in diameter thereby providing sufficient mass to store heat over each cycle.

At higher cryogenic temperatures such as 20° K., and above the function of the lead thermal input capacitor 18 could be combined integrally with heat conductor 17 by using brass instead of copper. Brass is characterized by its high thermal capacity and fast thermal time constant at these temperatures and therefore is capable of being used for a unitary heat transfer mass at 17.

To provide further dampening of the thermal oscillations a cylindrical thermal length filter 21 having a predetermined length is mounted in thermal contact with the flat forward face of the heat conductor 17. One type of material which could be used for the thermal length filter 21 is a mixture of 50% lead and 50% indium. This mixture has a relatively high thermal capacity although less than lead—and a relatively long thermal time constant in this size body at cryogenic temperatures, roughly in tenths of a second. The dimensions are $^{11}/_{32}$ inch long and ⅝ inch in diameter. The temperature oscillations and heat flux oscillations between the heat conductor 17 and a copper mounting plate 36 are virtually eliminated at the heat load 13 by the thermal length filter 21 without greatly increasing temperature at the load.

With the above described device, it is possible to accept a cold input of 0.4 watt with a gas temperature oscillation between 10° K. and 12° K. to obtain a cold output at the heat load 13 of 0.1 watt at 12° K.$\pm\approx 10^{-7}$° K.

Another material which could be used for the thermal length filter is Teflon. An advantage of using Teflon is that it can be one-third as long as the lead-indium mixture to obtain the same degree of dampening. Teflon, however, has a rather high thermal resistance so that the load temperature will be somewhat greater than when a lead-indium mixture is used.

The heat from the forward end of the thermal length filter 21 is transferred through the copper mounting plate 36 which is clamped thereto by a copper clamping plate 37 and the conventional threaded fasteners 38 and 39. As previously mentioned, the thermal time constant of copper of this size at the cryogenic temperatures is in microseconds and, therefore, any heat flux received by the thermal length filter 21 is transferred almost immediately from the heat load 13 without creating substantial temperature gradients.

As previously mentioned, the heat load 13 could be an infrared radiation detector made of copper and germanium. Thus, as infrared radiation is transmitted through the IR filter 26 it is detected by the heat load 13 which is maintained at a virtually constant temperature. As a result, thermal noise is virtually nonexistent.

While the salient features of the invention have been illustrated and described with respect to a particular embodiment, it should be readily apparent that numerous modifications may be made within the spirit and scope of the invention and it is therefore not desired to limit the invention to the exact details shown.

What is claimed is:

1. In combination with a cyclic refrigerator and a heat load, a thermal oscillation filter comprising: a heat conductor means connected to conduct cold from the cyclic refrigerator; a thermal capacitor means having the characteristics of a higher thermal capacity than said heat conductor, said thermal capacitor being connected in thermal contact with said heat conductor to smooth temperature excursions therein; and a thermal length filter having the characteristics of a higher thermal capacity, and a longer thermal time constant than those characteristics of said heat conductor, said thermal length filter being connected between and in contact with said heat conductor and the heat load to conduct cold to and virtually eliminate temperature excursions at the heat load.

2. In combination with a cyclic cryogenic refrigerator and a heat load, a thermal oscillation filter comprising: a heat conductor means connected to conduct cold from the cyclic refrigerator; a thermal capacitor means having a mass with a greater thermal capacity than said heat conductor, said thermal capacitor being connected in thermal contact with said heat conductor to smooth temperature excursions therein; and a thermal length filter having the characteristics of a higher thermal capacity, and a longer thermal time constant than those characteristics of said heat conductor, said thermal length filter being connected between and in contact with said heat conductor and the heat load to conduct cold to and virtually eliminate temperature excursions at the heat load.

3. In combination with a cyclic cryogenic refrigerator and a heat load, a thermal oscillation filter comprising: a heat conductor means connected to conduct cold from the cyclic refrigerator; a thermal capacitor means having the characteristics of a greater thermal capacity than said heat conductor, said thermal capacitor being connected in thermal contact with said heat conductor to smooth temperature excursions therein; and a thermal length filter having a cross-sectional area and a length sufficient to provide a higher thermal capacity and a longer thermal time constant than those characteristics of said heat conductor, said thermal length filter being connected between and in contact with said heat conductor and the heat load to conduct cold to and virtually eliminate temperature excursions at the heat load.

4. In combination with a cyclic cryogenic refrigerator and a heat load, a thermal oscillation filter comprising: a heat conductor means connected to conduct cold from the cyclic refrigerator; a thermal capacitor means having a mass with a greater thermal capacity than said heat conductor, said thermal capacitor being connected in thermal contact with said heat conductor to smooth temperature excursions therein; and a thermal length filter having a cross-sectional area and a length sufficient to provide a higher thermal capacity and a longer thermal time constant than those characteristics of said heat conductor, said thermal length filter being connected between and in contact with said heat conductor and the heat load to conduct cold to and virtually eliminate temperature excursions at the heat load.

5. In combination with a cyclic cryogenic refrigerator and a heat load, a thermal oscillation filter comprising: a heat conductor means connected to conduct cold from the cyclic refrigerator; a lead thermal capacitor means having the characteristics of a greater thermal capacity than said heat conductor, said thermal capacitor being connected in thermal contact with said heat conductor to smooth temperature excursions therein; and a thermal length filter having the characteristics of a higher thermal capacity and a longer thermal time constant than those characteristics of said heat conductor, said thermal length filter being connected between and in contact with said heat conductor and the heat load to conduct cold to and virtually eliminate temperature excursions at the heat load.

6. In combination with a cyclic cryogenic refrigerator and a heat load, a thermal oscillation filter comprising: a heat conductor means connected to conduct cold from the cyclic refrigerator; a thermal capacitor means having the characteristics of a greater thermal capacity than said heat conductor, said thermal capacitor being connected in thermal contact with said heat conductor to smooth temperature excursions therein; and a lead-indium thermal length filter having the characteristics of a higher thermal capacity and a longer thermal time constant than those characteristics of said heat conductor, said thermal length filter being connected between and in contact with said heat conductor and the heat load to conduct cold to and virtually eliminate temperature excursions at the heat load.

7. In combination with a cyclic cryogenic refrigerator and a heat load, a thermal oscillation filter comprising: a heat conductor means connected to conduct cold from the cyclic refrigerator; a lead thermal capacitor means having the characteristics of a greater thermal capacity than said heat conductor, said thermal capacitor being connected in thermal contact with said heat conductor to smooth temperature excursions therein; and a lead-indium thermal length filter having the characteristics of a higher thermal capacity and a longer thermal time constant than those characteristics of said heat conductor, said thermal length filter being connected between and in contact with said heat conductor and the heat load to conduct cold to and virtually eliminate temperature excursions at the heat load.

8. In combination with a cyclic cryogenic refrigerator and a heat load, a thermal oscillation filter comprising: a copper heat conductor means connected to conduct cold from the cyclic refrigerator; a lead thermal capacitor means having the characteristics of a greater thermal capacity than said heat conductor, said thermal capacitor being connected in thermal contact with said heat conductor to smooth temperature excursions therein; and a lead-indium thermal length filter having the characteristics of a higher thermal capacity and a longer thermal time constant than those characteristics of said heat conductor, said thermal length filter being connected between and in contact with said heat conductor and the heat load to conduct cold to and virtually eliminate temperature excursions at the heat load.

9. In combination with a cyclic cryogenic refrigerator and a heat load, a thermal oscillation filter comprising: a heat conductor means connected to conduct cold from the cyclic refrigerator; a lead thermal capacitor means having the characteristics of a greater thermal capacity than said heat conductor, said thermal capacitor being connected in thermal contact with said heat conductor to smooth temperature excursions therein; and a thermal length filter made of 50% lead and 50% indium and having a higher thermal capacity and a longer thermal time constant than those characteristics of said heat conductor, said thermal length filter being connected between and in contact with said heat conductor and the heat load to conduct cold to and virtually eliminate temperature excursions at the heat load.

10. In combination with a cyclic cryogenic refrigerator and a heat load, a thermal oscillation filter comprising: a heat conductor means connected to conduct cold from the cyclic refrigerator; a thermal capacitor means having the characteristics of a greater thermal capacity than said heat conductor, said thermal capacitor being connected in thermal contact with said heat conductor to smooth temperature excursions therein; and a Teflon thermal length filter having the characteristics of a higher thermal capacity and a longer thermal time constant than those characteristics of said heat conductor, said thermal length filter being connected between and in contact with said heat conductor and the heat load to conduct cold to and virtually eliminate temperature excursions at the heat load.

11. In combination with a cyclic cryogenic refrigerator and a heat load, a thermal oscillation filter comprising: a heat conductor means connected to conduct cold from the cyclic refrigerator; a lead thermal capacitor means having the characteristics of a greater thermal capacity than said heat conductor, said thermal capacitor being connected in thermal contact with said heat conductor to smooth temperature excursions therein; and a Teflon thermal length filter having the characteristics of a higher thermal capacity and a longer thermal time constant than those characteristics of said heat conductor, said thermal length filter being connected between and in contact with said heat conductor and the heat load to conduct cold to and virtually eliminate temperature excursions at the heat load.

12. In combination with a cyclic cryogenic refrigerator and a heat load, a thermal oscillation filter comprising: a heat transfer mass having a high thermal capacity and a fast thermal time constant at cryogenic temperatures, said heat transfer mass being connected in thermal contact with the cryogenic refrigerator to conduct cold therefrom; and a thermal length filter having the characteristics of a high thermal capacity and a longer thermal time constant than said heat transfer mass at cryogenic temperatures, said thermal length filter being connected between and in contact with said heat transfer mass and the heat load to conduct cold to and virtually eliminate temperature excursions at the heat load.

References Cited by the Examiner

UNITED STATES PATENTS

| | | | |
|---|---|---|---|
| 1,798,951 | 3/31 | Munters | 62—437 |
| 3,079,516 | 2/63 | Fisher | 310—437 |
| 3,105,148 | 9/63 | Monaghan | 250—71.5 |

WILLIAM J. WYE, *Primary Examiner.*

UNITED STATES PATENT OFFICE

CERTIFICATE OF CORRECTION

Patent No. 3,188,830 June 15, 1965

Kenneth W. Cowans

It is hereby certified that error appears in the above numbered patent requiring correction and that the said Letters Patent should read as corrected below.

Column 1, line 14, for "cyclicallyy" read -- cyclically --; column 2, line 35, for "expension" read -- expansion --; same column 2, line 47, for "instant" read -- constant --.

Signed and sealed this 30th day of November 1965.

(SEAL)
Attest:

ERNEST W. SWIDER
Attesting Officer

EDWARD J. BRENNER
Commissioner of Patents